US011104981B2

(12) United States Patent
Chen et al.

(10) Patent No.: US 11,104,981 B2
(45) Date of Patent: Aug. 31, 2021

(54) ALUMINUM-COBALT-CHROMIUM-IRON-NICKEL-SILICON ALLOY, POWDER AND CLADDING THEREOF

(71) Applicant: INDUSTRIAL TECHNOLOGY RESEARCH INSTITUTE, Hsin-Chu (TW)

(72) Inventors: Chi-San Chen, Kaohsiung (TW); Yu-Hsien Chou, Tainan (TW); Chao-Ming Chen, Pingtung County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 78 days.

(21) Appl. No.: 16/783,409

(22) Filed: Feb. 6, 2020

(65) Prior Publication Data

US 2021/0156007 A1   May 27, 2021

(30) Foreign Application Priority Data

Nov. 26, 2019   (TW) .................................. 108142839

(51) Int. Cl.
| | |
|---|---|
| *C22C 30/00* | (2006.01) |
| *B23K 26/342* | (2014.01) |
| *C23C 4/073* | (2016.01) |

(52) U.S. Cl.
CPC ............ *C22C 30/00* (2013.01); *B23K 26/342* (2015.10); *C23C 4/073* (2016.01)

(58) Field of Classification Search
CPC ....... C22C 30/00; C22C 27/06; B23K 26/342; C23C 4/073
See application file for complete search history.

(56) References Cited

U.S. PATENT DOCUMENTS

| | | | |
|---|---|---|---|
| 2017/0209922 A1 | 7/2017 | Kato et al. | |
| 2017/0209954 A1 | 7/2017 | Kato et al. | |

FOREIGN PATENT DOCUMENTS

| | | |
|---|---|---|
| CN | 102212733 B | 1/2013 |
| CN | 103757514 A | 4/2014 |
| CN | 104862510 A | 8/2015 |
| CN | 108677129 A | 10/2018 |
| CN | 108950255 A | 12/2018 |
| CN | 109706362 A | 5/2019 |
| CN | 110144476 A | 8/2019 |
| JP | 2016029195 A | 3/2016 |
| TW | I278521 B | 4/2007 |
| TW | I347978 B | 9/2011 |
| TW | I403594 B | 8/2013 |
| TW | I555856 B | 11/2016 |
| TW | 201728388 A | 8/2017 |

OTHER PUBLICATIONS

Tian, Lihui et al., Microstructural Evolution of AlCoCrFeNiSi High-Entropy Alloy Powder during Mechanical Alloying and Its Coating Performance, Materials 2018, 11, 320.
Taiwan Patent Office, "Office Action", Taiwan, dated Apr. 9, 2020.

*Primary Examiner* — Jessee R Roe
(74) *Attorney, Agent, or Firm* — Locke Lord LLP; Tim Tingkang Xia, Esq.

(57) ABSTRACT

An aluminum-cobalt-chromium-iron-nickel-silicon alloy has atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %. The disclosure applies the alloy design to develop a low-aluminum Al—Co—Cr—Fe—Ni—Si alloy composition, and has high-temperature hardness, high wear resistance, corrosion resistance and high temperature oxidation resistance.

7 Claims, 4 Drawing Sheets

ALUMINUM-COBALT-CHROMIUM-IRON-NICKEL-SILICON ALLOY, POWDER AND CLADDING THEREOF

CROSS REFERENCE TO RELATED APPLICATION

The application is based on, and claims priority from, Taiwan Application Serial Number 108142839, filed on Nov. 26, 2019, the disclosure of which is hereby incorporated by reference herein in its entirety.

TECHNICAL FIELD

The technical field relates to an aluminum-cobalt-chromium-iron-nickel-silicon alloy, in particular to an aluminum-cobalt-chromium-iron-nickel-silicon alloy, powder and cladding thereof.

BACKGROUND

In order to meet the need to increase the temperature of the combustion section of the engine turbine, the surface of the nickel-based superalloy needs a ceramic coating as a thermal barrier layer, and the metal bonding layer between the nickel-based superalloy and the ceramic must be used to improve the bonding strength of the two materials. The interface between the metal bonding layer and the thermal barrier layer ceramic YSZ currently used, with the thermal cycle, the thickness of the thermally grown oxide (TGO) increases, which causes the thermal barrier coating (TBC) to peel off. In addition, due to EU environmental requirements, it is necessary to produce halogen-free high glass fiber plastic parts, and plastic materials are added with inorganic flame retardants for fire safety and environmental protection regulations. Halogen-free plastics need to add a high proportion of flame retardants, which will cause serious corrosion of injection components. In order to improve the strength of plastic parts, a large amount of glass fiber is added, which causes severe wear of the injection components. The front end of the injection component is subjected to high temperature and high pressure environment, which causes severe wear and corrosion of the currently used SKD materials.

High-entropy alloys are alloys made of five or more metals of approximately equal content. For example, aluminum-cobalt-chromium-iron-nickel alloys are high-entropy alloys of five metals. It has been found in practical applications that high-entropy alloys have excellent characteristics such as high hardness, high-temperature hardness, wear resistance, corrosion resistance and high-temperature oxidation resistance, including high-entropy alloys which have excellent thermal stability and can increase the use temperature. The lower diffusion rate in high-entropy alloys can reduce the reaction rate between the bonding layer and the thermal barrier layer. The formation of a dense oxide layer on the surface of a high-entropy alloy can reduce the reaction rate between the bonding layer and the thermal barrier layer. The high-entropy alloy bonding layer has superior high-temperature oxidation resistance and can provide a higher operating temperature possibility for aerospace engines.

SUMMARY

The disclosure is to provide an aluminum-cobalt-chromium-iron-nickel-silicon alloy, powder and cladding thereof with excellent characteristics such as high hardness, high-temperature hardness, wear resistance, corrosion resistance, and high temperature oxidation resistance. The disclosure produces an aluminum-cobalt-chromium-iron-nickel-silicon alloy, powder and cladding thereof, and forms an aluminum-cobalt-chromium-iron-silicon (Al—Co—Cr—Fe—Ni—Si) alloy powder on the surface of a nickel-based superalloy as a metal bonding layer. In the disclosure, Al—Co—Cr—Fe—Ni—Si alloy powder is used, and the surface of the screw is cladded with thermal spray technology to improve the service life of the injection components.

The disclosure provides an aluminum-cobalt-chromium-iron-nickel-silicon alloy comprising atomic percentages of 4-12 at % aluminum, 15-25 at % cobalt, 25-35 at % chromium, 4-8 at % iron, 15-25 at % nickel, 10-25 at % silicon. The atomic percentage of aluminum plus silicon is between 18-32 at %.

The disclosure further provides an aluminum-cobalt-chromium-iron-nickel-silicon alloy powder comprising atomic percentages of 4-12 at % aluminum, 15-25 at % cobalt, 25-35 at % chromium, 4-8 at % iron, 15-25 at % nickel, 10-25 at % silicon. The atomic percentage of aluminum plus silicon is between 18-32 at %.

The disclosure further provides an aluminum-cobalt-chromium-iron-nickel-silicon alloy cladding comprising an aluminum-cobalt-chromium-iron-nickel-silicon alloy powder having atomic percentages of 4-12 at % aluminum, 15-25 at % cobalt, 25-35 at % chromium, 4-8 at % iron, 15-25 at % nickel, 10-25 at % silicon, and the atomic percentage of aluminum plus silicon between 18-32 at %, which is cladding on a substrate with cladding technology.

DETAILED DESCRIPTION

Figure 1:
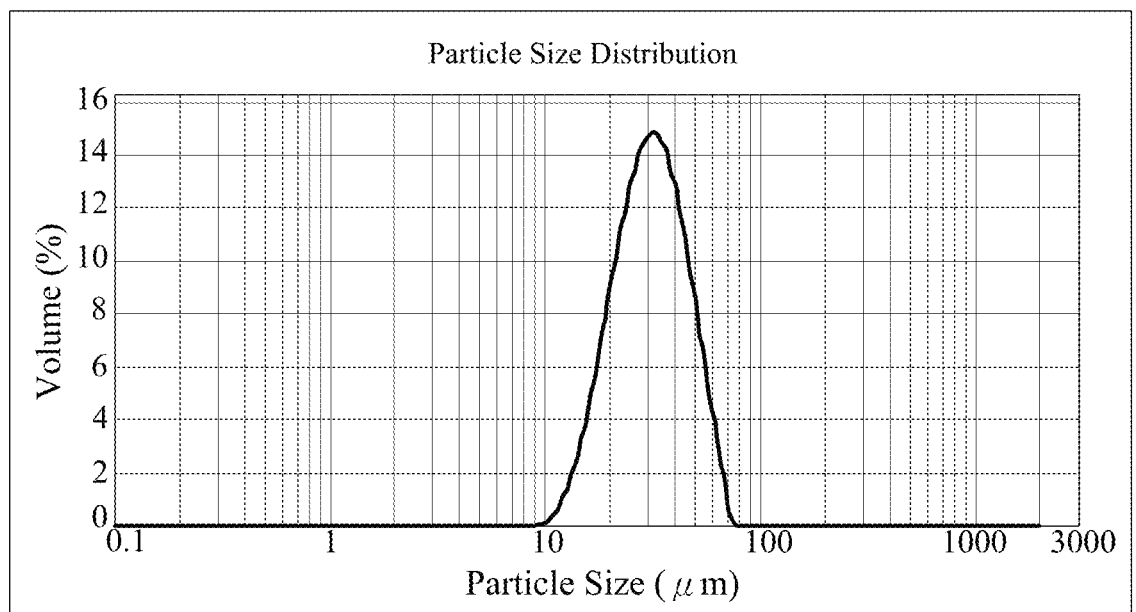
FIG. 1 is a graph of the particle size analysis results of the Al—Co—Cr—Fe—Ni—Si alloy powder according to an embodiment.

The disclosed embodiments produce an aluminum-cobalt-chromium-iron-nickel-silicon alloy with a low aluminum content. An aluminum-cobalt-chromium-iron-nickel-silicon alloy powder with consistent composition is produced by inert gas spray atomization technology, and then the aluminum-cobalt-chromium-iron-nickel-silicon alloy powder is cladded on the substrate with cladding technology to form an aluminum-cobalt-chromium-iron-nickel-silicon alloy cladding layer. Al—Co—Cr—Fe—Ni—Si alloy cladding layer has the characteristics of high-temperature hardness, high wear resistance, corrosion resistance and high temperature oxidation resistance.

Embodiment 1: An aluminum-cobalt-chromium-iron-nickel-silicon alloy has atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %. An aluminum-manganese-chromium-iron-nickel-silicon alloy has atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %.

Embodiment 2: An aluminum-cobalt-chromium-iron-nickel-silicon alloy powder has atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %. An aluminum-manganese-chromium-iron-nickel-silicon alloy powder has atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %.

The aluminum-cobalt-chromium-iron-nickel-silicon alloy powder is made of an aluminum-cobalt-chromium-iron-nickel-silicon alloy by using gas spray atomization, water spray atomization, centrifugal force atomization, ion atomization, or a combination of the two atomization methods described above. The aluminum-manganese-chromium-iron-nickel-silicon alloy powder is made of an aluminum-manganese-chromium-iron-nickel-silicon alloy by using gas spray atomization, water spray atomization, centrifugal force atomization, ion atomization, or a combination of the two atomization methods described above.

Embodiment 3: An aluminum-cobalt-chromium-iron-nickel-silicon alloy cladding includes an aluminum-cobalt-chromium-iron-nickel-silicon alloy powder, which is cladding on a substrate with cladding technology. The aluminum-cobalt-chromium-iron-nickel-silicon alloy powder has atomic percentages of 4-12 at % aluminum, 15-25 at % cobalt, 25-35 at % chromium, 4-8 at % iron, 15-25 at % nickel, 10-25 at % silicon, and the atomic percentage of aluminum plus silicon between 18-32 at %. An aluminum-manganese-chromium-iron-nickel-silicon alloy cladding includes an aluminum-manganese-chromium-iron-nickel-silicon alloy powder, which is cladding on a substrate with cladding technology. The aluminum-manganese-chromium-iron-nickel-silicon alloy powder has atomic percentages of 4-12 at % aluminum, 15-25 at % manganese, 25-35 at % chromium, 4-8 at % iron, 15-25 at % nickel, 10-25 at % silicon, and the atomic percentage of aluminum plus silicon between 18-32 at %. The above-mentioned aluminum-cobalt-chromium-iron-nickel-silicon alloy powder or aluminum-manganese-chromium-iron-nickel-silicon alloy powder is manufactured by the method of Embodiment 2.

The aluminum-cobalt-chromium-iron-nickel-silicon alloy cladding or the aluminum-manganese-chromium-iron-nickel-silicon alloy cladding can be cladded on a screw, roller, turbine blade or piston ring. The cladding technology includes a laser coating, thermal spray coating, cold spray coating or vacuum coating.

In the embodiments, one of the selected compositions of the aluminum-cobalt-chromium-iron-nickel-silicon alloy is $Al_{19.6}Co_{11.8}Cr_{25.4}Fe_{4.0}Ni_{19.6}Si_{19.6}$ at %, and the weight percentage is $Al_{11.8}Co_{15.6}Cr_{29.6}Fe_{5.0}Ni_{25.7}Si_{12.3}$ wt % for physical, chemical and mechanical properties analysis. FIG. 1 is a graph of the particle size analysis results of the Al—Co—Cr—Fe—Ni—Si alloy powder according to an embodiment. As shown in FIG. 1, $D_{50}$ is 31.8±0.3 μm.

Figure 2:
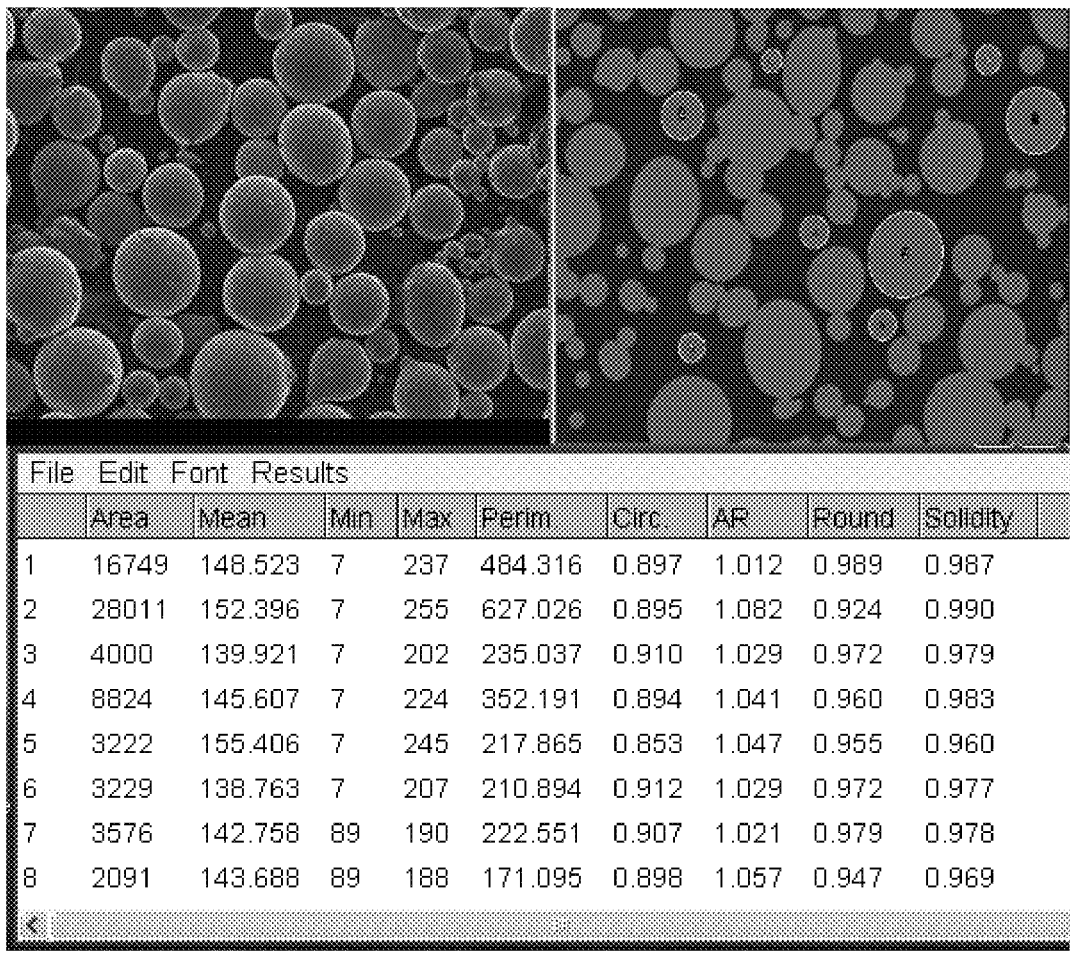
FIG. 2 is a graph of the true roundness analysis results of the Al—Co—Cr—Fe—Ni—Si alloy powder according to an embodiment.

FIG. 2 is a graph of the true roundness analysis result of the Al—Co—Cr—Fe—Ni—Si alloy powder according to an embodiment. As shown in FIG. 2, the aspect ratio of the alloy powder is 0.92±0.1.

Figure 3:
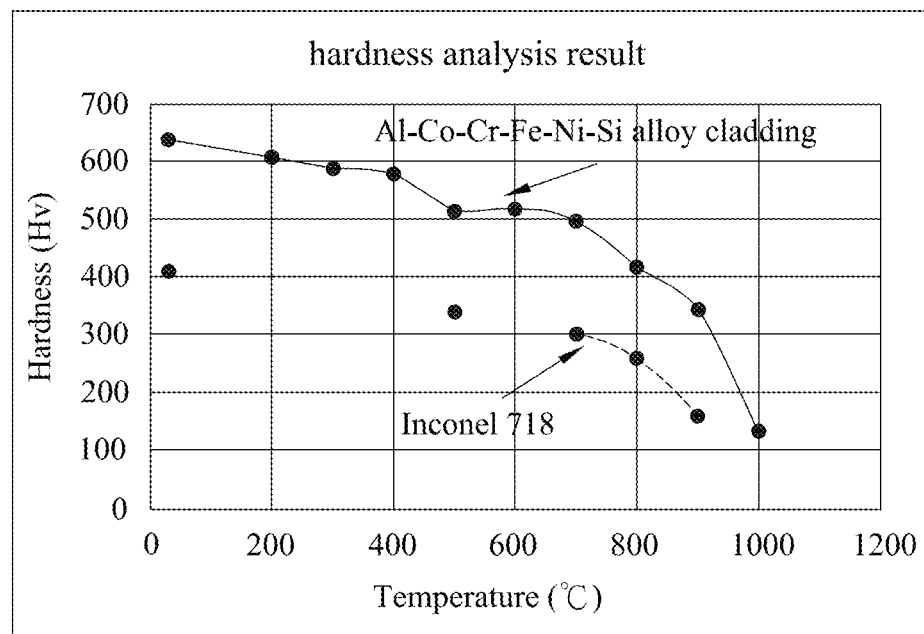
FIG. 3 is the hardness analysis results of the Al—Co—Cr—Fe—Ni—Si alloy cladding of an embodiment.

FIG. 3 is the hardness analysis result of the Al—Co—Cr—Fe—Ni—Si alloy cladding of an embodiment. The hardness at normal temperature 30° C. is 638.0±17.89 Hv, and the hardness at 600° C. is 517.9±10.0 Hv. The wear test of the cladding of the embodiments is $3.35 \times 10^{-6}$ mm³/N·m under the test conditions of a machine load of 3 kg (29.4N) and an abrasion distance of 5000 m.

Figure 4:
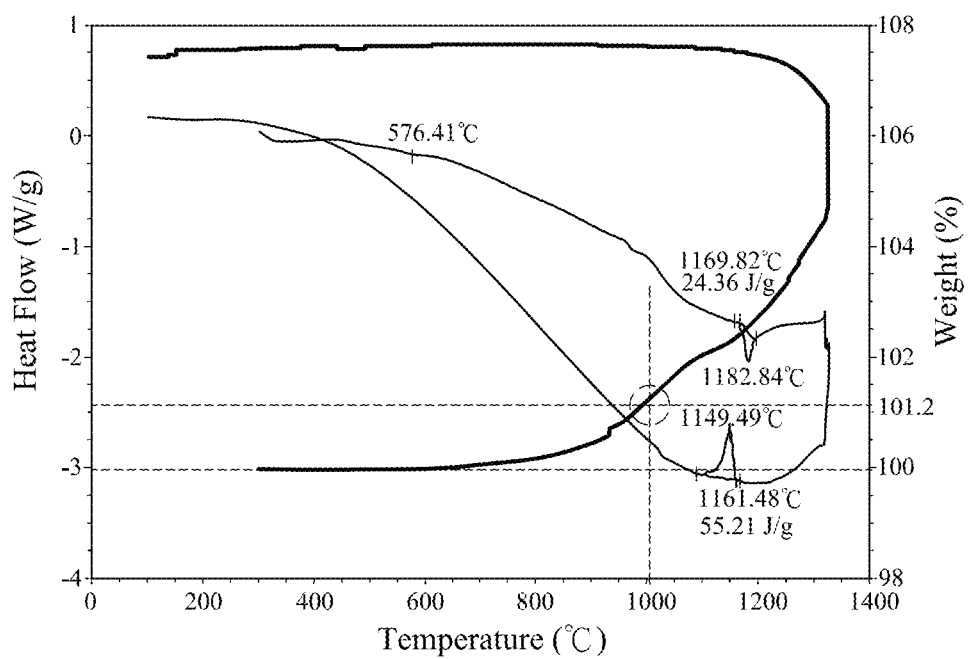
FIG. 4 is a graph of thermogravimetric analysis results of the Al—Co—Cr—Fe—Ni—Si alloy cladding according to an embodiment.

FIG. 4 is a graph of thermogravimetric analysis results of the Al—Co—Cr—Fe—Ni—Si alloy cladding according to an embodiment. As shown in FIG. 4, the high-temperature oxidation resistance can reach 1000° C., and the thermogravimetric value increases by about 1.2 wt %.

In the embodiments, another one of the selected compositions of the aluminum-cobalt-chromium-iron-nickel-silicon alloy is $Al_{8.9}Co_{21.8}Cr_{30.4}Fe_{6.2}Ni_{19.8}Si_{12.9}$ at %, and the weight percentage is $Al_{4.8}Co_{25.8}Cr_{31.8}Fe_{7.0}Ni_{23.4}Si_{7.3}$ wt % for physical, chemical and mechanical properties analysis. The thermogravimetric analysis result of the Al—Co—Cr—Fe—Ni—Si alloy cladding of this composition is that the thermogravimetric value increase is 0.6%, which is lower than the commercially available Stellite 6 alloy by 0.9%. The hardness of the Al—Co—Cr—Fe—Ni—Si alloy cladding of this composition at normal temperature 30° C. is 807.3±11.5 Hv, and the hardness at 600° C. is 511.2 Hv. The thermal expansion coefficient of the alloy cladding is $4.4 \times 10^{-6}$/° C. The wear test of the alloy cladding of the composition is $3.17 \times 10^{-6}$ mm³/N·m under the test conditions of a machine load of 3 kg (29.4N) and an abrasion distance of 5000 m.

Figure 5:
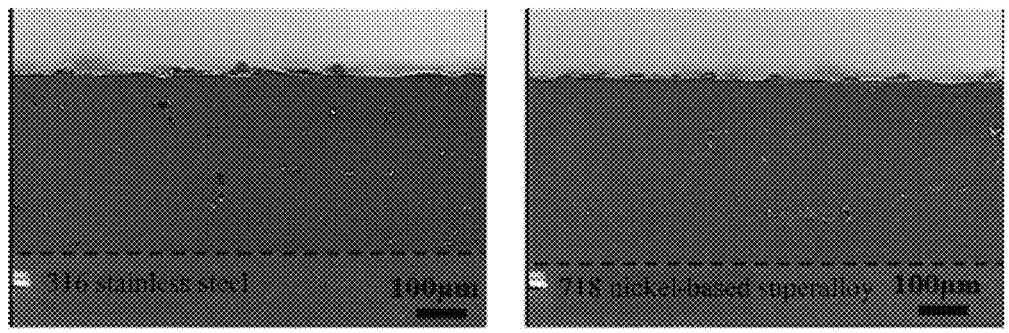
FIG. 5 is a scanning electron microscope SEM photograph of the Al—Co—Cr—Fe—Ni—Si alloy cladding of an embodiment.

FIG. 5 is a scanning electron microscope SEM photograph of the Al—Co—Cr—Fe—Ni—Si alloy cladding of an embodiment, which includes forming the alloy cladding on a 316 stainless steel and a 718 nickel-based superalloy substrate with the cladding technology. According to the ASTM C633 standard, the adhesion test result of the Pull-off Adhesive Test (PAT) analyzer is that the adhesion is 8933±24 psi (61.5 MPa), after the alloy cladding is formed on the 718 nickel-based superalloy substrate.

Figure 6:
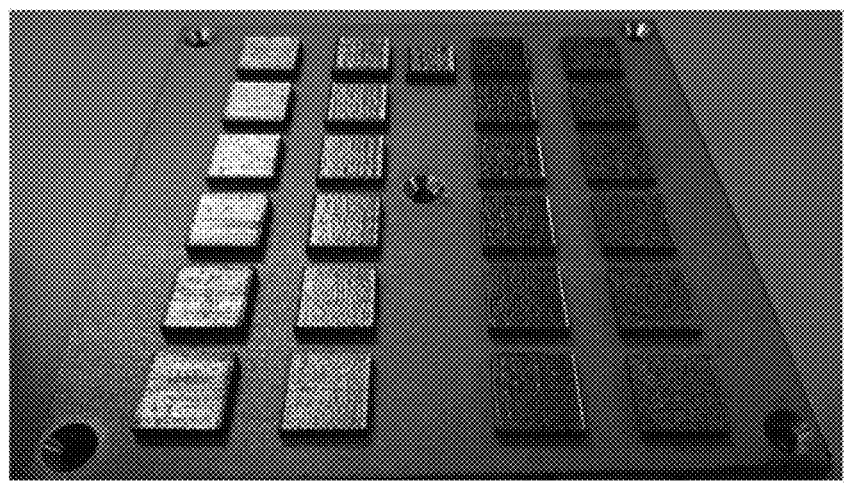
FIG. 6 is a photograph of a cladding test of the Al—Co—Cr—Fe—Ni—Si alloy cladding of an embodiment.

FIG. 6 is a photograph of a cladding test of the Al—Co—Cr—Fe—Ni—Si alloy cladding of an embodiment. The cladding test parameters of the Al—Co—Cr—Fe—Ni—Si alloy cladding are laser power of 400 W and laser scanning rate of 1600 mm/s. A cladding layer is formed on the surface of a 316 stainless steel substrate to make a 20 mm thick cladding layer. The cladding test results are without any cracks for the cladding layer formed on the 316 stainless steel substrate.

Figure 7:
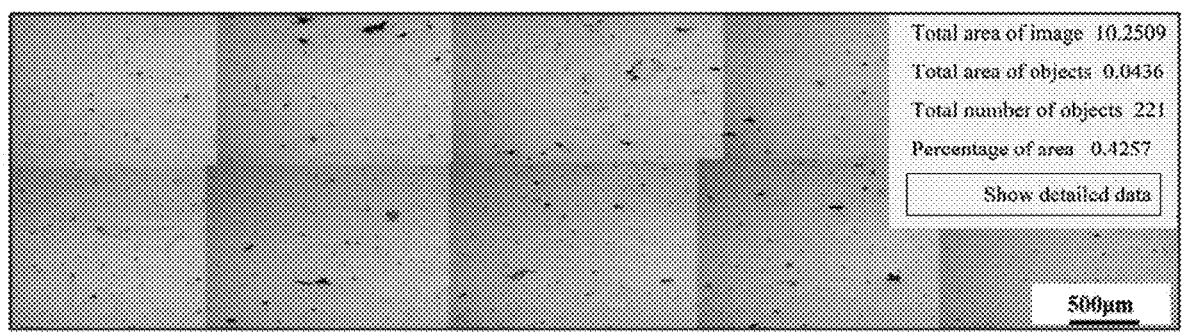
FIG. 7 is a result graph of the denseness analysis of the cladding layer of the Al—Co—Cr—Fe—Ni—Si alloy cladding according to an embodiment.

FIG. 7 is a result graph of the denseness analysis of the cladding layer of the Al—Co—Cr—Fe—Ni—Si alloy cladding according to an embodiment. The porosity of the alloy cladding is 0.43% and the denseness is 99.57% by image software analysis.

1. The embodiments apply the alloy design to develop a low-aluminum Al—Co—Cr—Fe—Ni—Si alloy composition, and has high-temperature hardness, high wear resistance, corrosion resistance and high temperature oxidation resistance.

2. The proportion of aluminum atoms in the alloy of the embodiments is lower than 12 at %, which can solve the problem of hot cracking during the cladding process. The atomic ratio of aluminum plus silicon should be higher than 18 at %, which can improve the high temperature resistance characteristics of the alloy.

3. The embodiments use an inert gas spray atomization process to produce a highly fluid alloy powder with consistent composition.

4. The embodiments use a cladding process to form a cladding layer with the alloy powder on a substrate. The cladding layer possesses a high density and has a high bonding force with the substrate.

The invention claimed is:

1. An aluminum-cobalt-chromium-iron-nickel-silicon alloy comprises atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %.

2. An aluminum-cobalt-chromium-iron-nickel-silicon alloy powder comprises atomic percentages of 4-12 at % aluminum, 15-25 at % cobalt, 25-35 at % chromium, 4-8 at % iron, 15-25 at % nickel, 10-25 at % silicon, wherein the atomic percentage of aluminum plus silicon is between 18-32 at %.

3. The aluminum-cobalt-chromium-iron-nickel-silicon alloy powder as recited in claim 2, wherein the aluminum-cobalt-chromium-iron-nickel-silicon alloy powder is made of an aluminum-cobalt-chromium-iron-nickel-silicon alloy by using gas spray atomization, water spray atomization, centrifugal force atomization, ion atomization, or a combination of the two atomization methods described above.

4. An aluminum-cobalt-chromium-iron-nickel-silicon alloy cladding comprises an aluminum-cobalt-chromium-iron-nickel-silicon alloy powder having atomic percentages of 4-12 at % aluminum, 15-25 at % cobalt, 25-35 at % chromium, 4-8 at % iron, 15-25 at % nickel, 10-25 at % silicon, and the atomic percentage of aluminum plus silicon between 18-32 at %, which is cladding on a substrate with cladding technology.

5. The aluminum-cobalt-chromium-iron-nickel-silicon alloy cladding as recited in claim 4, wherein the aluminum-cobalt-chromium-iron-nickel-silicon alloy powder is made of an aluminum-cobalt-chromium-iron-nickel-silicon alloy by using gas spray atomization, water spray atomization, centrifugal force atomization, ion atomization, or a combination of the two atomization methods described above.

6. The aluminum-cobalt-chromium-iron-nickel-silicon alloy cladding as recited in claim 4, wherein the substrate is a screw, roller, turbine blade or piston ring.

7. The aluminum-cobalt-chromium-iron-nickel-silicon alloy cladding as recited in claim 4, wherein the cladding technology includes a laser coating, thermal spray coating, cold spray coating or vacuum coating.

* * * * *